Sept. 14, 1954 J. W. McINTIRE 2,688,773
DIMENSIONAL STABILIZATION OF ORIENTED THERMOPLASTIC FILMS
Filed Dec. 26, 1951
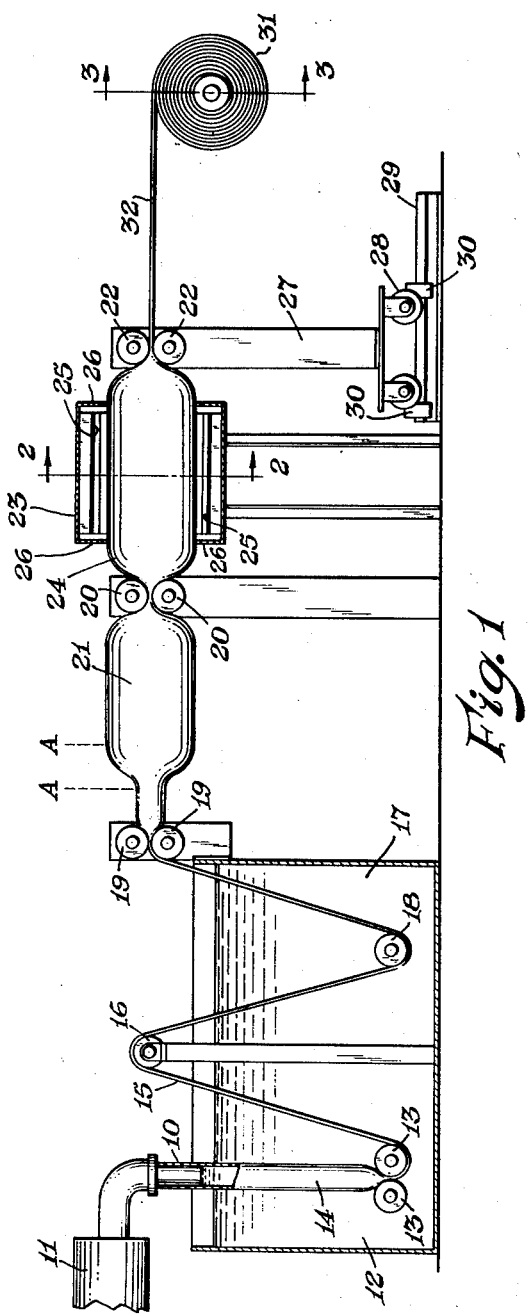
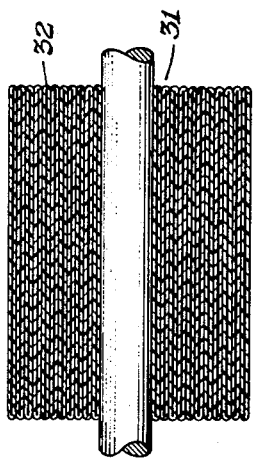
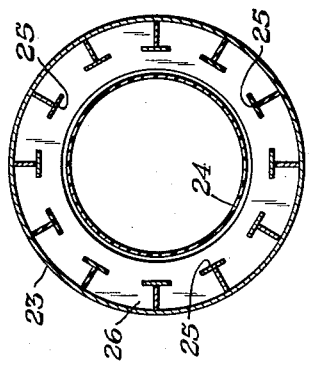
INVENTOR
John William McIntire
BY
Griswold & Burdick
ATTORNEYS Patented Sept. 14, 1954

2,688,773

UNITED STATES PATENT OFFICE 2,688,773

DIMENSIONAL STABILIZATION OF ORIENTED THERMOPLASTIC FILMS

John William McIntire, Midland, Mich., assignor to The Dow Chemical Company, Midland, Mich., a corporation of Delaware Application December 26, 1951, Serial No. 263,239

2 Claims. (Cl. 18—48)

This invention relates to a method of rendering oriented organic thermoplastic film dimensionally stable.

It is recognized that organic thermoplastic film, which has been stretched during the course of its production to effect orientation, is subject to internal strain and that the dimensions of such film may change, often to a non-uniform extent, during storage or upon exposure to heat. Various means have been proposed for rendering such film resistant to dimensional change, but most of the known methods are applicable only to the treatment of single thicknesses of flat film. Since much of the commercial plastic film is produced originally in tubular form and may be stored or shipped as rolls of flattened tube, the known treatments cannot be performed as a step in their process of manufacture but can only be applied after the tube is slit and opened to single thickness. It would be desirable, and it is the principal object of this invention, to provide a method of rendering tubular oriented organic thermoplastic film dimensionally stable. A related object is the provision of such method which can perform their stated functions continuously. A further object is to provide such a method which is capable of being used as an integral step in the production of oriented thermoplastic film. It is a special object to provide such a method which may be used effectively in the preparation of dimensionally stable film tubes made from oriented crystalline vinylidene chloride polymers. Other and related objects may become apparent from the following description.

The method of the present invention, whereby the foregoing objects are attained, comprises inflating a portion of a continuous length of a previously oriented tubular film between spaced sets of gas-confining constricting means, subjecting the so-inflated tubular film to evenly distributed radiant heat about its periphery, moving the film tube continuously and successively through the two constricting means and the intervening zone of radiation, and maintaining constant the pneumatic effect of the entrapped gas by adjusting the length of the inflated portion of the film tube to compensate for changes in temperature of said entrapped gas.

Apparatus suitable for carrying out the invention comprises a source of supply of oriented tubular film, two spaced means for constricting the film tube capable of holding a volume of gas in the portion of film being fed successively through said means, a cylindrical tunnel between the two constricting means, radiant heating elements mounted within said tunnel so as to distribute heat evenly about the periphery of an inflated length of tube passing through said tunnel, means for increasing or decreasing the distance between the spaced constricting means, and means for advancing film through and away from the constricting means and the intervening heating tunnel.

The constricting means most suitable for use in the practice of the invention are two sets of pinch rolls, one set usually being in a fixed position and the other set being movable along the line of travel of a film tube being drawn through the rolls. The portion of tube between the two sets of rolls is inflated to its normal cylindrical size. The so-inflated portion of the tube is exposed to radiant heat in the tunnel between the pinch rolls, and, as the entrapped air becomes heated and tends to expand, one set of the pinch rolls is moved so as to lengthen the inflated section and to prevent any change in diameter of the film tube. After the first few minutes of operation, little further change occurs in the temperature of the confined gas, and the position of the movable set of rolls remains relatively fixed. In this manner, a supply of tubular film is heat treated and rendered resistant to future change in dimensions without undergoing a dimensional change during the treatment. The degree of resistance to future change in dimension, commonly designated as "residual shrinkage," which is imparted to a film by the present process depends upon the temperature to which the film becomes heated during the process. Thus, if an untreated, oriented film is heated to 100° C. it may shrink 10 to 60 per cent, depending, in turn on its composition and degree of orientation. If, however, the same original film in tubular form is heated to 100° C. during its passage through the radiant zone in the present method and is thereafter reexposed to a 100° temperature in an unrestrained condition, it will show less than 3 per cent shrinkage, and this "residual shrinkage" value at 100° C. will be even smaller when the tubular film attains temperatures above 100° C. during the present treatment.

The invention will be illustrated with respect to the treatment of oriented crystalline vinylidene chloride copolymer film, and with reference to the accompanying drawing, wherein Fig. 1 is an elevation, partially in vertical section, showing the continuous production and thermal stabilization of an oriented crystalline vinylidene chloride copolymer film in tubular form;

Fig. 2 is a vertical cross-section through the radiant heating zone of the apparatus, taken along line 2—2 of Fig. 1; and, Fig. 3 is a vertical section through the roll of treated film, taken along line 3—3 of Fig. 1 and illustrating the uniformity of the treated product.

A tube of vinylidene chloride copolymer film is illustrated as being prepared and oriented continuously in the manner disclosed by Stephenson in U. S. Patent No. 2,452,080. Molten polymer 10 is extruded in tubular form downwardly from an extruder 11 into a supercooling bath 12 at 0°–20° C. and between pinch rolls 13. The portion of tube above rolls 13 contains a column of liquid lubricant 14. The flattened tube 15 is led from rolls 13 over guide roll 16 into a second and warmer water bath 17 at 20°–50° C., passing therein around guide roll 18. On emerging from bath 17, the supercooled tube 10 is taken through the bite of pinch rolls 19 and then through the bite of pinch rolls 20. Between rolls 19 and 20, the film tube is inflated with enough air to stretch the tube radially to the maximum extent possible without rupture. The amount of entrapped air in the resulting bubble 21 is deemed to be sufficient when an increase in that amount results only in elongating the distended part of the bubble, moving section A—A toward rolls 19, rather than in further radial distention of the bubble. Rolls 20 operated at a peripheral speed 2 to 4 times that of rolls 19, and the film tube passing through rolls 20 is an oriented crystalline product with high strengths measured both longitudinally and transversely. To this point, the process is that described in said prior patent. The flattened tube passing through pinch rolls 20 is inflated to its full diameter without stretching or distortion, and the inflating gas is confined therein by flattening the tube again in its passage through pinch rolls 22 which are located in the path of travel of the film tube beyond a heating tunnel 23, which is longitudinally centered between rolls 20 and 22, and which surrounds the inflated portion 24 of the oriented crystalline film tube. Radiant heating elements 25 are spaced about the interior of tunnel 23 so as to distribute heat evenly over the surface of the inflated tube 24 in its passage through the tunnel 23. The ends of the tunnel 23 are partially closed to minimize convection currents around the rapidly moving film tube 24, and a radial clearance of 1 to 3 inches between the circular openings in end plates 26 and the inflated tube 24 is generally satisfactory. Pinch rolls 22 are mounted on a frame 27 which is moveable along the line of travel of the film. Frame 27 is conveniently provided with flanged wheels 28 and mounted for movement on a track such as rails 29 which may be of any convenient length, suitably 3 feet or so. Frame 27 and its supported rolls 22 are prevented from unintended movement by rail dogs 30, which may be moved as desired. When radiation from the heating elements 25 in tunnel 23 heats and causes expansion of the gas in the inflated tube 24, the film tends to stretch slightly and such tendency is observed in the slightly greater width of resulting flattened film on the storage reel 31. This tendency is immediately overcome by moving rolls 22 and their supporting frame 27 toward the storage reel 31, lengthening the inflated portion of tube 24 between rolls 20 and 22, and returning the pneumatic pressure within tube 24 to its desired level. As a result of successive adjustments, it is possible to maintain a constant pneumatic pressure within the film tube, and the treated and flattened film 32 emerging from rolls 22 is of uniform dimensions. Most generally it is desired that the so-treated film tube 31 have the same gage and tubular dimensions as the film being supplied to the heating tunnel 23 through rolls 20.

The practice of the invention is illustrated as though the treatment is effected as a step in the continuous manufacture of tubular film, but need not be so limited. Thus a roll of previously prepared oriented tubular film may be used to feed the flattened tube through pinch rolls 20 and thence through the heating tunnel 23 as above described, with the desired results. In such case it may be more convenient to have the first set of pinch rolls moveable and the second set in a fixed position.

In a specific example, tubular film of oriented, crystalline vinylidene chloride copolymer 0.0005 inch thick and having a tubular diameter of 14 inches and a flattened width of 22 inches, was found to shrink 30 per cent in length and 40 per cent in diameter when immersed without tension in boiling water for 5 minutes. The resulting film was badly wrinkled, and had an average thickness of 0.0012 inch. When a portion of the film was heated to 100° C. under enough tension to prevent wrinkling, but under conditions to permit less than 70 per cent of its normal shrinkage at that temperature, in the conventional manner, the resulting wrinkle-free film had a thickness of 0.00083 inch and only 60 per cent of its original area, and upon reexposure to water at 100° C., in a relaxed condition, showed a "residual shirinkage" of 5 per cent. When, however, the main body of tubular film was fed continuously, at a linear rate of about 100 feet per minute, through rolls 20 and 22 and the intervening radiant heating tunnel 23, in the method of the present invention, a noticeably different and superior result was obtained. The heating tunnel was a cylindrical steel shell, 30 inches in diameter, and 39 inches long, having circular openings 20 inches in diameter centered in each end plate 26. Within the shell 23 were mounted at regular intervals about its circumference 15–1800 watt heating elements. The distance between rolls 20 and 22 was initially about 10 feet. The inflated tube 24 was prevented from sagging by supporting rolls, not shown, outside of tunnel 23. As the air in the inflated section of tube 24 began to heat up, the width of the flat film tended to increase on reel 31, and this tendency was offset continually by lengthening the inflated section 24. Within ten minutes, this section was about 12 feet long. Thereafter, in the course of the treatment of 5000 feet of tubular film, the inflated tube was lengthened further to 12 feet, 6 inches while maintaining constant the dimensions of the tubular film. The finished product 32 on reel 31 had an unchanged thickness of 0.0005 inch and a tubular diameter of 14 inches. A sample of this product, heated in a relaxed condition in water at 100° C. for 5 minutes exhibited 3 per cent residual shrinkage. The flat film was more uniformly "level" than the untreated film or than the product of any prior preshrinking process.

The invention is applicable to the treatment of any oriented tubular film, to improve its dimensional stability without need to change its dimensions during the treatment, including such tubes made from vinyl polymers, rubber hydrochloride or the like, in addition to the crystalline vinylidene chloride polymer of the examples. The process produces much more treated film in unit time than any process heretofore known, including those in which a preshrinking treatment is effected in hot water baths, and has the advantage over such processes of yielding directly a dry film.

I claim:

1. The method which comprises inflating with gas a portion of a continuous length of a previously oriented tubular organic thermoplastic film between spaced sets of pinch rolls effective to confine the inflating gas in said section of the tube, subjecting the so-inflated tubular film to evenly distributed radiant heat about its periphery, moving the film tube continuously and successively through the two sets of pinch rolls and the intervening radiation zone, and maintaining constant the pressure of the entrapped gas by adjusting the distance between the sets of pinch rolls to compensate for temperature changes in the entrapped gas, thereby to render the film dimensionally stable without significant change in dimension during the treatment.

2. The method claimed in claim 1, wherein the film being subjected to treatment is an oriented crystalline vinylidene chloride copolymer film in tubular form.

References Cited in the file of this patent

UNITED STATES PATENTS

| Number | Name | Date |
|---|---|---|
| 2,136,566 | Schnecko et al. | Nov. 15, 1938 |
| 2,317,409 | Seaton | Apr. 27, 1943 |
| 2,401,798 | Reichel | June 11, 1946 |
| 2,517,570 | Irons | Aug. 8, 1950 |
| 2,517,581 | Lowry et al. | Aug. 8, 1950 |